Sept. 19, 1933.   W. H. LEDBETTER   1,927,177
HOT PLOW
Original Filed Feb. 10, 1923   3 Sheets-Sheet 1
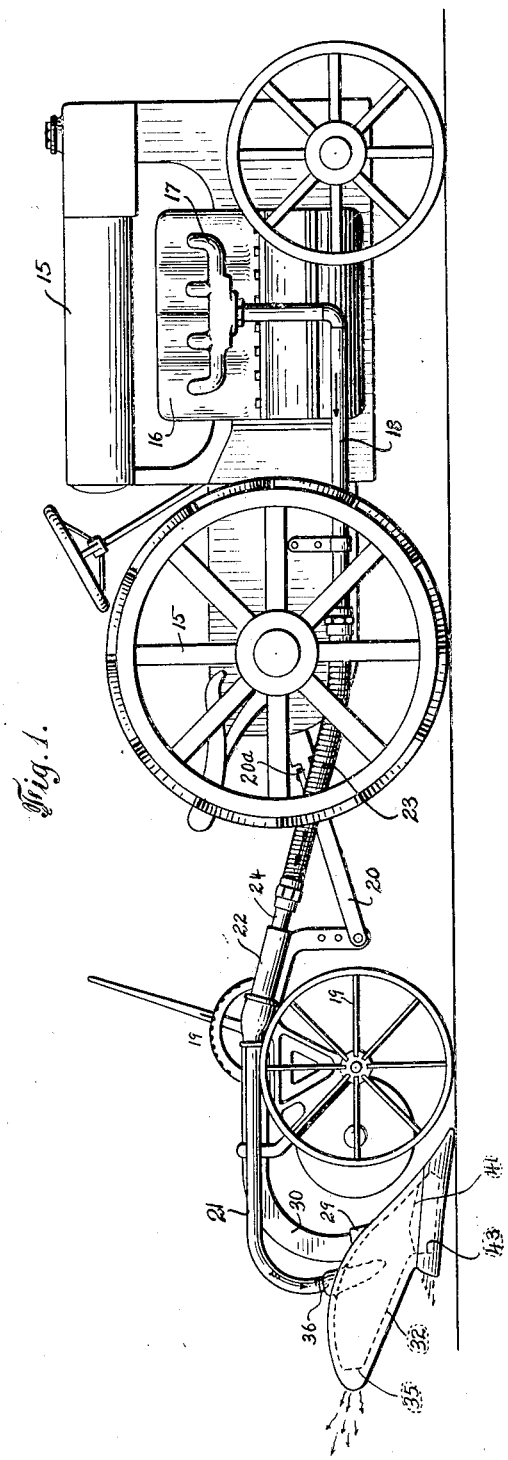
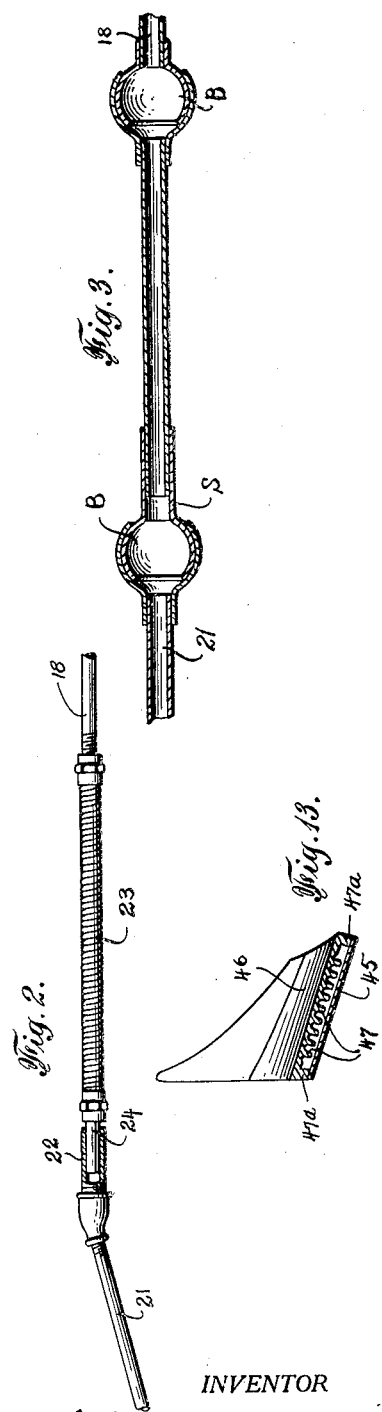
INVENTOR
Wm. H. Ledbetter
BY
Bohleber & Ledbetter   ATTORNEYS

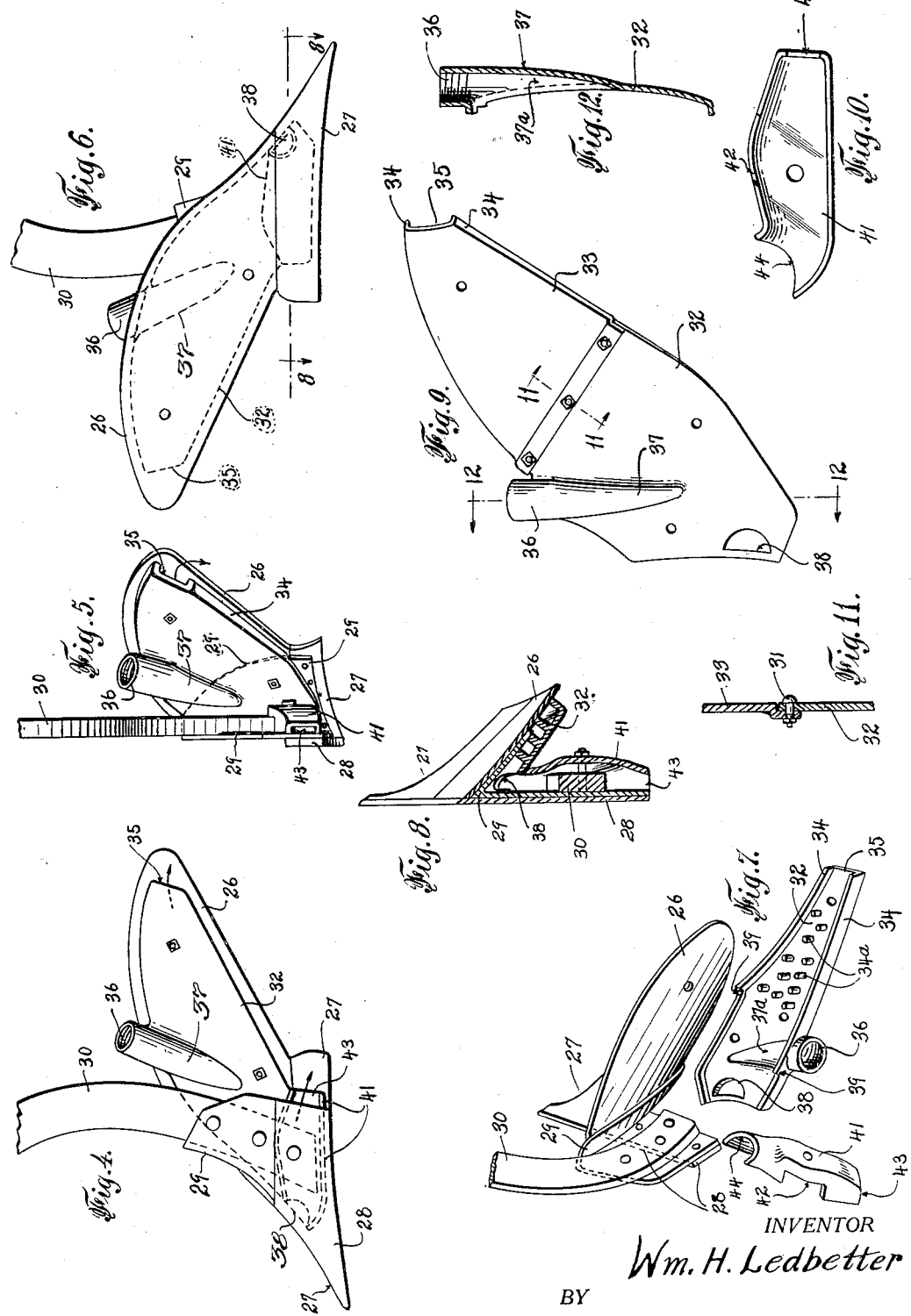

Sept. 19, 1933.  W. H. LEDBETTER  1,927,177
HOT PLOW
Original Filed Feb. 10, 1923   3 Sheets-Sheet 3
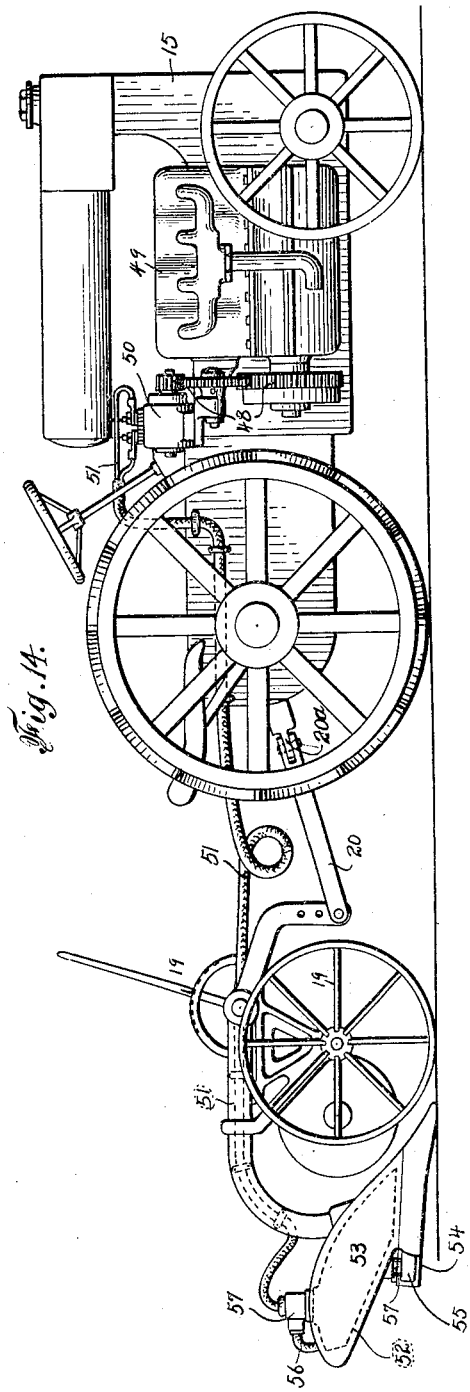
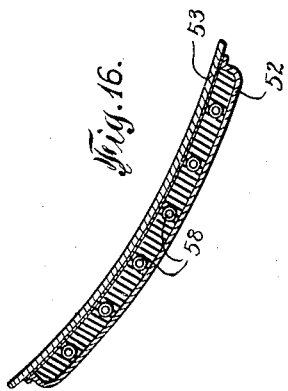
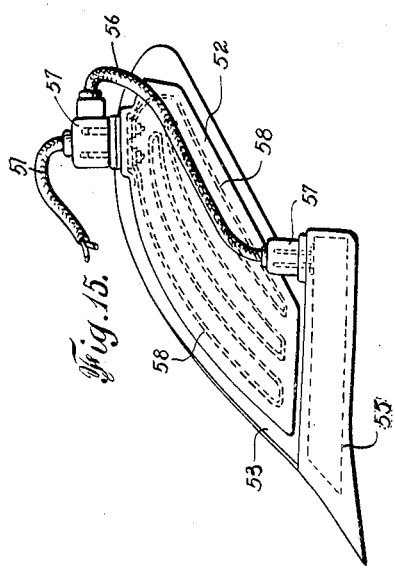
INVENTOR
Wm. H. Ledbetter.
BY
Dobleber & Ledbetter ATTORNEYS Patented Sept. 19, 1933

1,927,177

UNITED STATES PATENT OFFICE 1,927,177

HOT PLOW

William H. Ledbetter, Dallas, Tex.

Application February 10, 1923, Serial No. 618,325
Renewed July 31, 1931

22 Claims. (Cl. 97—116)

This invention relates to agricultural implements such as plows, tractors, and the like, and more particularly relates to improvements in soil shedding heated plows. The present application constitutes an improvement over my Patent Number 1,445,148 granted Feb. 13, 1923, and also relates to improvements in plow bottoms and heating jackets therefor and useful in connection with the agricultural rig covered in my former patent.

A primary object of this invention is to provide ways and means for effectively causing adhesive soils to shed or slip and release from motor drawn plows during cultivation of the soil and to use heat for such purposes, using either waste heat from engines or electric heat therefor; and it is a particular object to improve the plow heating facilities such as jackets and the like, as well as improve the connecting means established between the plows and heat generating devices.

A further object is to produce a motor or tractor-drawn implement having structurally improved plows capable of shedding moist or wet soil through which the plow passes so as to reduce the draft on the plow thus diminishing the load on the tractor to the end that plowing and cultivating operations are more economically effected.

The accompanying drawings illustrate an exemplary embodiment of my improved agricultural implement and soil shedding plow, serving to explain the principle of this invention, the construction of which may be adapted to various modified forms to better suit the needs of the manufacturer and user.

Figure 1 illustrates a side view of the agricultural rig or tractor and plow connected together ready for use, and shows the heating connection established between the tractor engine and plow or plows of the implement.

Figure 2 illustrates the flexible connection used between the tractor and implement; and Figure 3 illustrates a modified form of flexible connection which also may be employed, both of which are capable of permitting lateral and longitudinal relative motion between the implement and the tractor, as well as permitting the necessary vertical or up and down relative motion between the tractor and the implement which action occurs when the plows are raised and lowered.

Figure 4 shows the land side or inner side of the plow equipped with the improved heating jackets; Figure 5 shows a rear view thereof; and Figure 6 shows an outside moldboard view of the plow.

Figure 7 is a perspective disassembled illustration of the plow with the jacket parts removed and in position ready to be assembled, as observed from above and to the rear of the plow.

Figure 8 shows a sectional view as taken on the line 8—8 of Figure 6 which shows the connection between the two heating jackets.

Figure 9 shows the moldboard jacket removed from the plow; and Figure 10 shows the land side jacket removed from the plow.

Figure 11 is a sectional view taken on the line 11—11 of Figure 9 to show how a large size moldboard jacket may be made in sections and bolted together to form a unitary structure.

Figure 12 is a sectional view taken on the line 12—12 of Figure 9 to illustrate the intake nipple as integrally formed with the wall of the moldboard jacket.

Figure 13 illustrates a modified and improved form of heated corrugated moldboard which is very efficient in use because of the large heating surface provided.

Figure 14 illustrates an improved form of tractor implement or plowing rig constituting a combined tractor and tilling implement with a plow or plows heated electrically from a generator.

Figure 15 shows an inside view of the moldboard provided with the electrical heating element or pad.

Figure 16 is an enlarged sectional view of the electrically heated moldboard illustrating the application of an electrical heater thereto.

Referring now more particularly to the drawings for a more detailed description of the invention, there is shown a tractor 15 driven by an engine 16; and in the drawings the exhaust side of the engine is shown with the exhaust manifold 17 connecting with an exhaust pipe 18 leading rearwardly of the tractor. A cultivating implement 19 is connected to the tractor 15 by any suitable draft link 20 and hitch clevis 20a which possess sufficient flexibility as to permit ample relative motion, both vertically and laterally, between the said implement and tractor, as is usual in plowing rigs of this character. The cultivating implement carries a pipe 21 which extends forwardly of the implement where a sleeve 22 is fixed thereto. A flexible tubular connection 23 has one end fixed to the pipe 18 on the tractor and the other end fixed to a slide tube 24, and this tube 24 is slidably confined within the sleeve 22 forming a loose telescope connection.

The flexible tubular connection 23 permits a free universal movement of the tractor and implement relatively one to the other during plowing operations and also permits turning movement; and the slide tube connection 22 and 24 affords relative longitudinal movement between the tractor and implement, thereby enabling the combined tractor and plowing rig to negotiate uneven or hilly ground surfaces such as changes in elevation as well as turns during plowing operations. The flexible connections illustrated afford positive connection without leakage of the exhaust gas or heating medium.

I have found that an exhaust or gaseous conductor may to advantage include a flexible connection and a slip-joint means which gaseous conductor is capable of performing a double function, namely, longitudinal motion, and lateral and vertical universal motion which better serves the requirements than ordinary flexible tubes, hence the reason for devising or adopting this particular form of construction. While I do not claim broadly this improved flexible tubular connection, I do claim its novelty as applied and used in combination with my invention.

A description of the improved plow-bottom heating jackets will now be given, and reference is made to the remaining figures of the drawings. One form of plow bottom largely in use is illustrated for the purpose of explaining how my improved heating jackets are used in connection with the said plow, but it is to be appreciated how these jackets may be used with various constructions.

In one type of plow bottom a frog 29 is usually employed as a foundation plate upon which a moldboard 26 is secured, and a plow point 27 is provided, together with a land side 28 which are the composite parts of one type of plow bottom such as a turning plow or middle burster plow; and for the purpose of this disclosure I have chosen the so-called turning plow to illustrate my invention. A plow beam 30 reaches downwardly along the inner face of the frog and is securely bolted thereto. It is to be appreciated that this particular frog 29 is capable of such change in shape and design as will accommodate a middle burster moldboard as well as the illustrated turning plow moldboard. I have provided means for heating the frog as will be observed from the following description.

My improved moldboard heating jacket in one form essentially comprises a plate or jacket 32 secured to the back surface of the plow moldboard leaving a heating space or chamber between the wall of the jacket and moldboard. This jacket 32 is provided with a marginal flange 34, and this flange 34 closely engages or fits against the surface of the moldboard thus forming the heating space; and at the upper outer jacket end there is provided an exhaust opening 35 through which the heating medium or engine exhaust passes from the heating chamber to atmosphere.

The moldboard jacket 32 is made with an intake nipple or heat receiving duct connection 36 the upper end of which is cylindrical in form and may be threaded or otherwise provided with means for establishing permanent connection with a pipe such as the conduit 21 heretofore described, and the lower portion 37 of the nipple tapers out and merges into the wall jacket structure 32, thus providing a large opening into the heating chamber with a tapered exterior convex portion 37 and an interior open concave wall or mouth portion 37a. Furthermore, this intake duct 36—37 lies generally in parallel relation to the jacket or wall structure which forms the enclosed heating chamber because the axis of the duct approaches the jacket at such a small angle thereto that the mouth 37a of the duct opens thru the heating chamber wall on a long tapered and gradual slope which affords a convenient and improved form of construction. This construction permits a large volume of hot gas or other heating medium to flow through the port 36 and become well distributed within the narrow heating space afforded by the jacket and provides a neatly appearing jacket construction.

On the lower inner end of this moldboard jacket there is formed a land side exhaust opening 38 through which a portion of the heating medium flows from the moldboard jacket to the land side jacket as later described. The moldboard jacket is preferably notched, as at 39 in the flange 34, which notches permit the moldboard jacket to fit up closely to the rear surface of the frog 29 and moldboard 26, thereby extending the heating chamber far down toward the point of the plow and to the center thereof covering the frog which effectively heats the entire working surface of the plow; and I have so improved my plow structure that the frog forms a part of the heating chamber as well as acting as a foundation plate to carry the wings or moldboards and the plow points.

A landside heating jacket 41 is applied to the inner side of the plow-bottom against the landside of the plow in contact with the frog 29, or in contact with the landside 28 where frogs are not employed, by bolting or otherwise securing this jacket 41 to the plow-bottom; and the construction of the jacket 41 is such that it fits over and around the lower end of the plow beam 30 in order that the land side of the plow be heated. This landside jacket is made with a notch 42 which notch fits around the plow beam 30 affording a clearance space between the beam and the jacket wall 41 thereby allowing the hot exhaust gases to discharge rearwardly from an exhaust opening 43. The forward end of the land side jacket has a mouth or port 44 which embraces the hole 38 in the jacket 32 thereby establishing a passage 38—44 from the moldboard jacket to the land side jacket. This construction and arrangement of parts permits the hot exhaust gas which discharges into the moldboard jacket 32 to circulate throughout the entire space afforded by both jackets 32 and 41; and the exhaust gas discharges outwardly from the jacket exhaust ports 43 and 35 after having given up a large part of its heat to the walls of the plow bottom.

Figures 9 and 11 show a modified construction of the moldboard jacket which is so designed as to afford convenience in the manufacture thereof. The moldboard jacket 32, in this instance, is preferably made in sections 32 and 33, the two sections overlapping and being secured together with bolts 31. This plan of construction is preferably in some cases where moldboard parts are manufactured for large plows, for in such a case it is more practical to make the jacket in sections and thereafter bolt them together.

The heating jackets in Figures 7 and 8 and 9 possess lugs 34a preferably made integral with the jacket and designed to contact the back of the plow moldboard when the jacket is placed in position. This arrangement expedites and intensifies the heating of the moldboard because the heat rapidly flows through the lugs from the jacket to the moldboard inasmuch as the moldboard constantly is losing part of its heat in contact with the moist earth. The lugs therefore serve the useful purpose of absorbing the heat from the hot gases circulating through the heating chamber, and transmitting this heat to the working face of the plow moldboard.

In Figure 13 I have illustrated another modified and improved form of plow construction. The moldboard 46 is ribbed or corrugated on the back side thereof, the numeral 47 designating the ribs or corrugations, which are utilized for the purpose of increasing the heat absorbing area and thus more rapidly absorbing the heat which is discharged into the heating space which is formed by a cover 45 applied to the back of the plow to enclose the corrugations and form the heating chamber. A rib or flange 47a is made around the plow 46 to receive the cover 45. The corrugations 47 very largely increase the area of the inner moldboard wall which is exposed to the heat thereby more rapidly absorbing heat from the heating medium circulating through the jacket. This plan of construction also increases the strength of the plow moldboard 46 thus enabling the thickness of the wall to be somewhat diminished which causes the heat to more rapidly flow from the ribbed or corrugated surface to the front working face of the plow moldboard.

In operation, the engine 16, such as an internal combustion gasolene or kerosene engine as well as a steam engine, emits a considerable portion of exhaust waste heat, and this heat is transmitted through the pipe 18, the flexible connections 23 and 22, and through the pipe 21 into the jacketed plow. The continual supply of heated gas to the chamber formed by the jacket 32 keeps the working face of the moldboard 26 hot as well as the land-side 28; and the result is that the plow passes through the wet soil with less resistance by reason of the fact that the soil will not adhere to the heated plow. The location of the exhaust ports in the plow jackets causes the heating medium to thoroughly traverse the entire heating space thus keeping the plow uniformly hot.

The flexible tubular connection shown in Figure 3 possesses ball and socket joints B with a tubular slip joint sleeve S, and this arrangement executes a universal movement affording free movement in all directions between the tractor and implement, and may be used to the same effect as the other tubular connections heretofore described.

Referring now particularly to Figures 14, 15 and 16, it is seen that I have provided an electric heating equipment for raising the temperature of the moldboard and land-side of plows which is a practical and economical arrangement for heating the plows thus eliminating the exhaust pipe construction heretofore described. In the present form of the electrical rig, there is illustrated a motor driven electrical generator operated from the tractor engine, but in some cases it may be desirable to locate the electrical generator upon the tilling implement and in such a case the said generator is chain or gear driven from one of the ground wheels of the said implement.

The tractor engine 49 drives the generator 50 through any suitable power transmission means such as gears 48 or by a chain. A flexible electrical cable 51 connects the electric generator 50 with an electric heating element or pad 52, having electrical heating coils 58, which is secured to the back surface of the plow moldboard 53. The land side 54 is also provided wtih an electric heating element 55; and the two heating pads 52 and 55 are connected together with a cable 56 so that the generator may supply current to both heating elements, thereby raising the temperature of the plow. The cables 51 and 56 are provided with heavy substantial plug-in connections 57 which are metal armored and locked in position to withstand the rough usage encountered in farm work and plowing.

My hot plow operates under light load inasmuch as the dirt does not stick to the heated plow surfaces, the plow stays in the ground with less effort because its contour and turning face is not impaired or altered by caked sticking soil, no time is lost in stopping to clean off the moldboards, and plowing conditions are in general improved and reduced in cost and labor because the tractor engine consumes less fuel and the deterioration of machinery is diminished.

What I claim is:

1. A plow and earth tilling rig comprising a tractor, an engine to drive the tractor, a plow, a pivotal draft link between the tractor and the plow, gaseous heating means on the plow, a gaseous conductor between the engine and the gaseous heating means on the plow including a gas conducting pipe extending from the gaseous heating means, an engine exhaust extending towards the rear of the tractor, a flexible tubular connection between the gas conducting pipe and the engine exhaust, and a slip joint means in the gaseous conductor to permit longitudinal extension of the gaseous conductor.

2. A hot plow equipment comprising a frog, a moldboard secured to the frog, and a jacket provided with notches in the margin thereof adapting it to fit around the frog and on the moldboard.

3. A hot plow soil shedding equipment comprising a plow frog, a moldboard carried by the frog, means for enclosing the frog and rear surface of the moldboard, and exhaust-gas means for heating the frog and the moldboard.

4. A hot plow soil shedding equipment comprising a plow frog, a land side piece carried by the frog, a moldboard mounted upon the frog, means for enclosing the frog, the land side piece, and the moldboard, and means for heating the same.

5. A soil shedding plow comprising a moldboard and land side, a plow frog supporting the said moldboard and landside, a plow beam fixed to the frog, a jacket secured to the moldboard over the frog, and a jacket secured to the landside, said jackets having abutting connecting openings to permit a heating medium to flow from one jacket to the other.

6. A soil shedding implement comprising a plow, a landside carried by the plow, a plow beam secured to the plow, a landside jacket notched and adapted to fit around the plow beam and form a heating chamber adjacent the landside, and means to supply heat to the chamber.

7. A soil shedding plow comprising a jacket enclosing a heating space, and a plurality of lugs made integral with the jacket contacting the plow.

8. In a plow, a moldboard and a landside joined together along one side thereof and forming the front end of the plow and a point carried at the juncture, means forming a heating chamber behind the plow and including a jacket means carried on the moldboard and a jacket means carried on the landside and shaped to fit up into the juncture aforesaid toward the plow point to heat both the moldboard and the landside near the point, said jacket means having a passage at the juncture aforesaid and near the plow point whereby the moldboard and landside heating chambers are interconnected, and an exhaust port formed in each jacket means remote from the passage to vent the heating chamber to atmosphere.

9. In a plow, a moldboard having a heating chamber and an enclosing wall therefor, a landside having a heating chamber and an enclosing wall therefor, a forwardly directed plow point carried by the moldboard and landside, the two enclosing walls reaching forwardly under the point, a passage formed in the two enclosing walls at the front end of the plow under the point connecting the two heating chambers, an exhaust port formed at the rear end of the landside heating chamber, and an exhaust port formed at the rear end of the moldboard heating chamber.

10. In a plow, an enclosing wall for the rear surface thereof forming a heating chamber to receive exhaust gases from an engine, and a duct integral with the wall, the axis of the duct lying generally in a plane substantially parallel to the wall, whereby the duct approaches the wall at a small angle, said duct and wall being joined by an open mouth of substantially long formation opening into the heating chamber.

11. In a plow, an enclosing wall for the rear surface thereof forming a heating chamber, and a duct integral with the wall, the axis of the duct lying generally in a plane substantially parallel to the wall, whereby the duct approaches the wall at a small angle, said duct and wall being joined by an open mouth of substantially long formation opening into the heating chamber, said mouth being of tapered formation, starting in the full size of the duct, and tapering to a point, whereby the area of the mouth is substantially equal to the cross-sectional area of the duct.

12. In a plow, a jacket having a marginal flange extending around it and abutting the plow to space the jacket from the plow to form a heating chamber, said marginal flange being cut away along one portion and edge of the jacket to provide an exhaust port leading from the heating chamber to atmosphere.

13. In a plow, a jacket having a marginal flange extending around it and abutting the plow to space the jacket from the plow to form a heating chamber, said marginal flange being cut away along one portion and edge of the jacket to provide an exhaust port leading from the heating chamber to atmosphere, and a landside jacket forming a heating chamber carried by the plow, the two jackets abutting at the front of the plow and being provided with connecting passages, the landside jacket being provided with an exhaust port.

14. A soil shedding plow embodying a jacket forming a heating chamber at the rear of the plow face, and heat transmitting means disposed between the jacket and plow face, comprising irregularly formed surface portion means projecting into the heating chamber to transmit heat to the plow face.

15. A soil shedding implement comprising a plow having a front working face and a rear heat absorbing surface means forming an extended area of heat absorbing surface, and a jacket enclosing the means and the extended area of heat absorbing surface to form a heat retaining chamber.

16. A soil shedding implement comprising a plow having corrugations on its rear surfaces, and a cover plate adapted to enclose the corrugations and form a heating chamber.

17. In a plow having a front working face and a rear surface, a jacket carried on the rear of the plow and thereby enclosing the rear surface to form a heating chamber between the jacket and working face, and corrugations within the heating chamber to facilitate heat absorption to efficiently heat the working face.

18. A soil tilling rig comprising in combination, a tractor driven by an internal combustion engine the operation of which generates a heating medium, a plow connected with the tractor and including moldboard and landside means and also having a heating device at the rear of said moldboard and landside means, and a transmission line interconnected between the tractor and heating device to convey the heating medium from the tractor to the plow moldboard and landside means by which the motive energy of the engine raises the temperature of the plow.

19. A soil tilling rig comprising in combination, a tractor and motor means to propel the same, an electric generator, a plow drawn by the tractor, a resistance heating element on the plow, and wire connection between the generator and heating element.

20. A soil shedding implement comprising a plow, an electric heater attached to the plow, and a source of electric current feeding to the heater.

21. A soil shedding implement comprising a plow, an electric heating element secured to the plow, an electric generator for supplying current to the electric heating element, and means for driving the generator.

22. A soil shedding implement comprising a plow, an electric heating element secured to the plow, an electric generator for supplying current to the electric heating element, a traction machine attached to the plow, and an engine to drive the tractor and the generator.

WM. H. LEDBETTER.